Oct. 22, 1963

K. A. RUDDOCK 3,108,220

ELECTROMAGNETIC METHOD AND APPARATUS FOR GEOPHYSICAL PROSPECTING
INCLUDING MEANS FOR GENERATING AN AUXILIARY FLUX
FIELD TO CANCEL DIRECT COUPLING BETWEEN
THE PRIMARY AND PICK-UP COILS

Filed March 8, 1956

Inventor:
Kenneth A. Ruddock

By Rudolph J. Jurick
Attorney

Fig. 3

TRANSMITTER TERMINALS  RECEIVER TERMINALS

Fig. 4

TRANSMITTER COIL  AUXILIARY COILS  RECEIVER COIL

Inventor:
Kenneth A. Ruddock
By Rudolph J. Gurick
Attorney

Oct. 22, 1963 K. A. RUDDOCK 3,108,220
ELECTROMAGNETIC METHOD AND APPARATUS FOR GEOPHYSICAL PROSPECTING
INCLUDING MEANS FOR GENERATING AN AUXILIARY FLUX
FIELD TO CANCEL DIRECT COUPLING BETWEEN
THE PRIMARY AND PICK-UP COILS
Filed March 8, 1956 6 Sheets-Sheet 4

Fig. 12

BLOCKING OSCILLATOR PLATE VOLTAGE WAVEFORM

Fig. 13

United States Patent Office 3,108,220
Patented Oct. 22, 1963

3,108,220
ELECTROMAGNETIC METHOD AND APPARATUS FOR GEOPHYSICAL PROSPECTING INCLUDING MEANS FOR GENERATING AN AUXILIARY FLUX FIELD TO CANCEL DIRECT COUPLING BETWEEN THE PRIMARY AND PICK-UP COILS
Kenneth A. Ruddock, Jerome, Ariz., assignor, by mesne assignments, to Varian Associates, Palo Alto, Calif., a corporation of California
Filed Mar. 8, 1956, Ser. No. 570,225
25 Claims. (Cl. 324—6)

This invention relates to a method of and apparatus for geophysical exploration and more particularly to an airborne, electro-magnetic arrangement for establishing the existence of a sub-surface conducting ore zone.

The principle of airborne electro-magnetic prospecting is quite well known. The low frequency electro-magnetic method of geophysical prospecting utilizes a large primary coil of several wire turns carrying several amperes of current, such coil being tuned to a generator frequency of usually in the range of 400–2000 cycles per second. Magnetic flux lines, generated by such current flow, link with the buried, massive sulphide body, having a conductivity of 1–100 mhos. per meter, and generate eddy currents within the body. These eddy currents in themselves generate a secondary magnetic field of the same frequency, but generally somewhat out of phase with respect to the primary field. The secondary field is detected, on or above the ground surface, by a secondary, or pick-up, coil of many turns. The pick-up coil is generally tuned to the frequency of the current applied to the primary coil and connected to a tuned amplifier and detector.

An airborne, electro-magnetic, prospecting equipment must be capable of measuring the relatively small changes in the voltage induced in the pick-up coil. At the same time provision must be made to eliminate or compensate for such changes of pick-up coil induced voltage as result from changes in relative position or orientation of the primary and pick-up coils, due to plane vibration, bending or thermal expansion. Elimination or compensating for such changes of pick-up coil induced voltage as result from changes in relative position or orientation of the primary and pick-up coils is generally the most difficult problem encountered in the development of airborne, electro-magnetic, prospecting apparatus.

The data obtained with the apparatus of my invention is highly accurate and reliable with respect to establishing the location of a sub-surface conducting ore zone. Means are provided for compensating for the direct effects of the primary coil on the pick-up coil system, the latter being mounted on the same airframe as the primary coil. The apparatus also provides a continuous measurement of the in-phase and out-of-phase components of the secondary voltage in the pick-up coil at a frequency which does not correspond to harmonics of power line frequencies, say 390 cycles per second. Briefly, our invention includes features having the following advantages over prior apparatus:

(1) By orienting an auxiliary coil in coaxial relation to the primary and pick-up coils, and in relatively close proximity to the pick-up coil, and passing the primary coil exciting current through the auxiliary coil in such a direction so as to cancel the direct coupling of the primary and pick-up coils, and mounting the coils on a rigid structure so as to substantially maintain such coaxial relationship between the three coils, we eliminate the need for accurate frequency stability of the exciting current in the primary and auxiliary coils and also the requirement for maintaining a corresponding critical resonant frequency in the receiving apparatus.

(2) As a result of the coaxial orientation of the primary, pick-up, and auxiliary coils, we compensate for, and substantially eliminate, the deleterious effects of a airframe vibration and bending which otherwise would result in changes in pick-up coil induced voltage.

(3) By employing a unique feedback technique, we eliminate the need for maintaining the spacing between the primary and pick-up coils at some critical value; slow changes in spacing being automatically compensated for by the feedback technique.

(4) We employ a novel technique for continuously measuring the in-phase and out-of-phase components of the voltage induced in the pick-up coil system. This is achieved by sampling, at selected times, the amplitude of the total induced voltage. Specifically, the peak amplitude of the in-phase component is obtained by sampling at the instant that the out-of-phase component passes through zero and, similarly, the out-of-phase component is obtained by sampling at the time that the in-phase component passes through zero.

(5) As a result of the sampling at the operating frequency of the primary field, it is possible to include in the apparatus a simple circuit having a relatively long time constant thereby substantially eliminating interfering effects of noise signals at other frequencies such as, for example, power line noises.

An object of this invention is the provision of a method and apparatus for use in making geophysical exploration and which is capable of providing diagnostic data having an accuracy and reliability factor exceeding that heretofore possible.

An object of this invention is the provision of an airborne method and apparatus for establishing the location of a sub-surface conducting ore zone and which is not as susceptible as heretofore to erroneous indications due to anomalies arising from the presence of lakes, muskegs, etc.

An object of this invention is the provision of a method of establishing the presence of a sub-surface conducting body, which method comprises establishing a primary alternating flux field in the region of the body and measuring the resultant voltage induced in a pick-up coil at the instant the said primary flux field passes through its zero and peak values.

An object of this invention is the provision of apparatus for electro-magnetic geophysical exploration and which includes coaxially oriented primary and pick-up coils positioned at either end of an airframe, thereby reducing to a minimum the changes in pick-up coil voltage resulting from bending and vibration of the airframe.

An object of this invention is the provision of apparatus for electro-magnetic geophysical exploration and which includes a novel feedback technique which automatically compensates for a change of voltage in the pick-up coil due to any slow shift in the relative positions of the primary and pick-up coils.

An object of this invention is the provision of geophysical exploration apparatus of the electro-magnetic type which apparatus includes means for sampling the voltage induced in a pick-up coil at the instant that the exciting magnetic field passes through its zero and maximum values, and means for rejecting from the receiver circuit interfering effects produced by noise signals.

An object of this invention is the provision of airborne apparatus for use in establishing the location of a sub-surface ore body, said apparatus comprising coaxially oriented primary and pick-up coils located at either end of an airframe, an auxiliary coil or coils positioned near the pick-up coil, means for passing a current of predetermined frequency through the primary and auxiliary coils in such a phase relation so as to substantially cancel the direct effect of the primary flux field in the pick-up coil, means continuously recording the in-phase and out-of-phase components of the voltage induced in the pick-up coil by a secondary field resulting from the presence of a conducting ore body, and sampling means for obtaining the measurement of said in-phase and out-of-phase components when the said current passes through its maximum and zero value, respectively.

An object of this invention is the provision of apparatus for use in establishing the location of a sub-surface ore body comprising means for establishing an alternating current primary flux field of predetermined frequency in the region of the ore body, a pick-up coil system developing a voltage as a result of a secondary flux field due to the eddy currents flowing in the ore body, means substantially canceling the primary flux field at the pick-up coil including an auxiliary coil or coils which establishes an auxiliary flux field of opposite phase and substantially equal strength as the primary flux field at the pick-up coil, means including a feedback coil inductively coupled to the pick-up coil system for canceling the remainder of the primary flux field in the pick-up coil, and means providing measuring the in-phase and out-of-phase components of the said voltage induced in the pick-up coil as a result of the secondary flux field at the instant that the primary flux field passes respectively through its maximum and zero values.

An object of this invention is the provision of apparatus for making geophysical explorations comprising a transmitter coil and an auxiliary coil or coils, means passing an exciting current of predetermined frequency through the transmitter and auxiliary coils, a receiver coil connected to the input side of an amplifier, means tuning the receiver coil to the frequency of the exciting current, said transmitter, receiver, and auxiliary coils being coaxially positioned and spaced relative to each other so that the primary flux field established by the transmitter coil and the auxiliary flux field established by the auxiliary coil or coils substantially cancel each other at the receiver coil, a feedback coil for impressing a voltage component into the receiver coil in a sense opposed to the in-phase component of voltage induced in the receiver coil as a result of the small amount of primary flux field remaining in the receiver coil after said substantial cancellation of the primary flux field by the auxiliary flux field, means for impressing a voltage component into the receiver system in a sense opposed to the out-of-phase component of voltage induced in the receiver coil after said substantial cancellation of the primary flux field by the auxiliary flux field, means receiving the in-phase and out-of-phase components of voltage induced in the receiver coil as a result of eddy currents flowing in a conducting body lying in the field of influence of the primary flux field generated by the transmitter coil, means amplifying said in-phase and out-of-phase components, means sampling the in- and out-of-phase components at the instant the exciting current passes through its maximum value and zero value, respectively, means measuring the in-phase and out-of-phase components from the samplers, such measured components being taken as indicative of the presence of an ore body.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
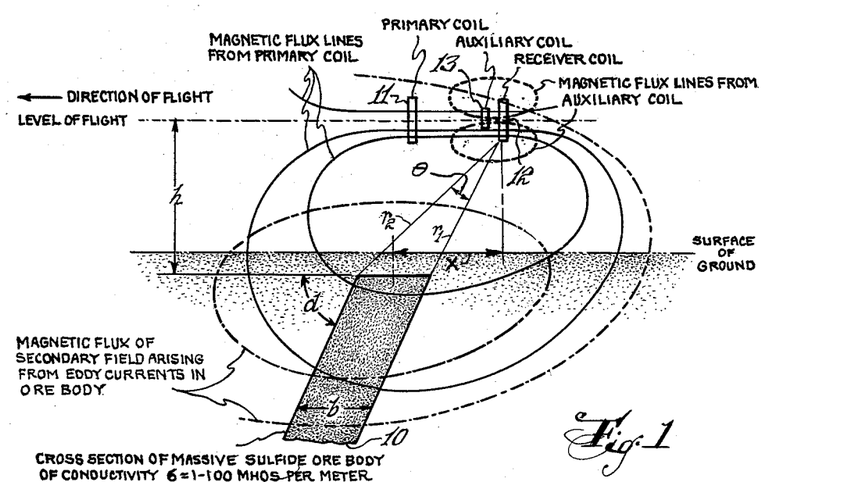
FIGURE 1 is a diagrammatic representation, in elevation, showing a sub-surface sulphide ore body, elevated primary, pick-up, and auxiliary coils and the relative character of the primary, secondary and auxiliary magnetic flux fields.

Reference is now made to FIGURE 1 wherein there is shown a steeply dipping massive sulphide body 10 under shallow cover. It is assumed that an aircraft flies over the body, said craft carrying a primary coil 11, pick-up coil 12 and auxiliary coil 13. The coils may take any suitable shape, such as circular square, rectangular, etc; however, for purposes of explanation, it will be assumed that the turns of the coils are of a circular shape. All of the coils are oriented in a coaxial relationship and the plane of each of the coils is approximately at a right angle to the line of flight. (The plane of any one of the above-mentioned coils being that plane which extends through the coil perpendicular to the axis of the coil.)

The horizontal secondary field at the pick-up coil, due to eddy currents induced in the sulphide body by the primary field, is:

$$H_s = H_p(M+iN)(\sin^2 d \log r_2/r_1 - (\sin d)(\cos d)\theta)$$

The horizontal secondary field at the pick-up coil in-phase with the primary field is:

$$H'_s = H_p.M.(\sin^2 d \log r_2/r_1 - (\sin d)(\cos d)\theta)$$

The horizontal secondary field at the pick-up coil out-of-phase or in quadrature with the primary field is:

$$H''_s = H_p.N.(\sin^2 d \log r_2/r_1 - (\sin d)(\cos d)\theta)$$

where:

$H_p$ is the essentially horizontal primary field at the sulphide body,

M and N are parameters related to the conductivity and dimensions of the sulphide body and the frequency used. M is involved in the in-phase and N in the out-of-phase amplitude of the resulting secondary field, $d$ is the dip of the ore body in degrees.

$r_2$ and $r_1$ are distances from the upper ore body margins to the pick-up coil, $\theta$ is the angle in radians subtended by the upper ore body width at the pick-up coil, $h$ is the vertical height between top of body and pick-up coil, and X is the horizontal distance between center of body and pick-up coil.

Figure 2:
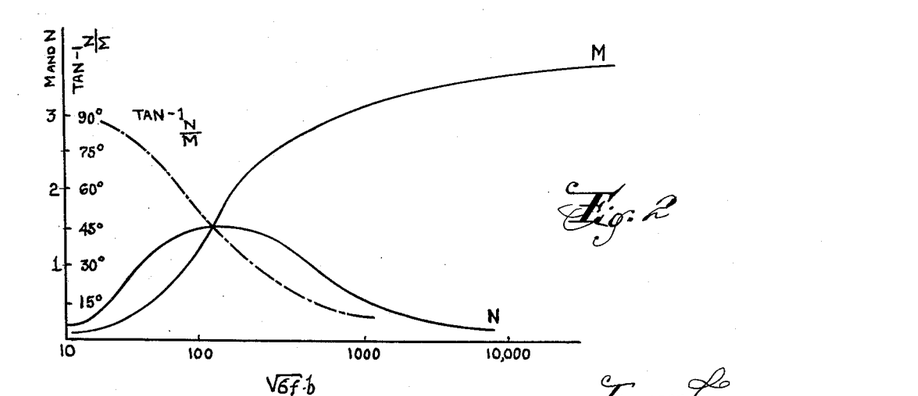
FIGURE 2 is a set of curves showing the relationship between certain in-phase and out-of-phase parameters M and N relates to the conductivity and dimensions of the sulphide body and the frequency, $f$, of the current flowing in the primary coil.

The above quantities are depicted in FIGURES 1 and 2, with FIGURE 2 showing the parameters M and N, and $\tan^{-1} N/M$ (the phase angle of the secondary field), in their relation to $\sqrt{\sigma f b}$ where:

$\sigma$ is the conductivity of the sulphide body in mhos. per meter, $f$ is the frequency of the primary field in cycles per second, and $b$ is the breadth in meters of the sulphide body.

FIGURE 2 applies for all bodies of long strike length and tabular cross section.

Suppose we have recorded the magnitudes of the in-phase and out-of-phase secondary horizontal component $H'_s$ and $H''_s$. The ratio $H''_s/H'_s = N/M$ and we can thus find the phase angle $\tan^{-1} N/M$. Knowing the phase angle and using the curve for $\tan^{-1} N/M$ in FIGURE 2 we find a value for $\sqrt{\sigma f b}$ and values of M and N corresponding to this value of $\sqrt{\sigma f.b}$. Knowing either M or N and either $H'_s$ and $H''_s$ we can now solve for the dimensions of the body as we now have a value for $$(\sin^2 d \log r_2/r_1 - (\sin d)(\cos d)\theta) = \frac{H'_s}{H_p M} = \frac{H''_s}{H_p N}$$

If the dip of the body is steep, as is generally the case for massive sulphide occurrences, then $d=90°$, $\cos d=0$, $\sin d=1$ and we thus have a value for $\log r_2/r_1$ which to a first approximation is a value for $$\frac{bX}{X^2+h^2} = \frac{H'_s}{H_p M} = \frac{H''_s}{H_p M}$$

Here $h$ is the height of the aircraft above ground as the cover is usually shallow. X can be read off the response curve as the distance between the center point of the anomaly and any marginal point by which you wish to make the above determinations.

Since X and $h$ are known we thus have a value for $b$ and once $b$ is known, $\sigma$ is derivable from the value of $\sqrt{\sigma f.b}$.

The values of $b$ and $\sigma$ usually suffice to tell whether massive sulphides or a surface feature are the cause of the anomaly. Thus, sulphides have $\sigma=1$ to 100 mhos. per meter and $b$ from 10 to 100 meters. Terrain or surface features of swamps and lakes have $\sigma=\frac{1}{10}-\frac{1}{100}$ mhos. per meter and $b$ usually of 100 meters or more.

If the magnitude of the secondary component is measured at two, widely spaced frequencies these magnitudes can be plotted against frequency on log-log paper and fitted to M or N versus $\sqrt{\sigma f.b}$, also plotted on log-log scale. From the fit a value of M or N and $\sqrt{\sigma f.b}$ at one of the frequencies is immediately derivable.

It can be shown that terrain features because of their limited thickness behave more as flat lying cylinders (than as vertical sheets) and that for such a case the out-of-phase component rises, i.e. does not reach a maximum until $\sqrt{\sigma f b}=720$ where $b$ is the diameter of the cylinder or breadth of the feature. An average conductivity for a terrain feature is $\sigma=\frac{1}{36}$ mhos. per meter whence at 400 cycles $\sqrt{\sigma f b}=\frac{1}{6}\times 20\times 100=333$. This means that the phase angle is well above 45° for most terrain features. On the other hand, most massive sulphide zones behave as steep dipping sheets or tabular zones. For these the out-of-phase component reaches a maximum at $\sqrt{\sigma f b}=120$, see FIGURE 2, and thereafter decreases. Now for a value of $\sigma=1$ mho. per meter $f=400$ cycles per second and $b=10$ meters $\sqrt{\sigma f b}=200$ so that the phase angle will be well below 45°. Thus, knowledge of the phase angle immediately differentiates between at-surface flat lying terrain conductors and sub-surface steep dipping massive sulphides. If the proper frequency is used, e.g. 400 cycles, as above, then, terrain features will exhibit phase angles greater than 45°, i.e. the out-of-phase component will be greater than the in-phase, and steep dipping massive sulphides 10 meters or more wide will give rise to phase angles less than 45°, i.e. the out-of-phase component will be less than the in-phase. Where the components are about equal, a terrain or surface conductor may actually be covering a massive sulphide body. In such case measurements either the in-phase or out-of-phase secondary component at a second altitude will resolve the uncertainty.

Measurements of the magnitudes of the in-phase and out-of-phase secondary voltage components at approximately 400 cycle frequency suffice, then, to identify the presence of steep dipping massive sulphides 10 meters or more in width and to differentiate them from surface conducting features such as swamps or muskegs.

To permit measurements of the secondary voltage components it is necessary to eliminate or buck out the effects of the primary field at the pick-up coil or coils. This may be accomplished by orienting the pick-up coil or coils so that there is minimum coupling between them and the primary coil, by using an accessory coil or coils to buck out the effect of the primary field in the pick-up or actual detector coil, or by making the measurement of the secondary out-of-phase field at the instant the primary field is zero.

Also, to make measurements of the secondary field components it is necessary to maintain relative position and orientation between the primary and pick-up coils or to arrange that relative change of position or orientation does not introduce or change primary field effects.

One way to reduce the direct primary field effect on the pick-up coil is to space the coils far apart with one in the aircraft and the other in a towed bomb or bird. This also has the advantage of getting the pick-up coil nearer the ground and nearer the source of the secondary field. This method is generally selected, for when the primary and pick-up coils are placed together within a few feet of each other on a single rigid frame, the primary field must be compensated out, or eliminated, to the order of one part in one million. However, the towed bird has the disadvantages of changing relative position between pick-up and primary coils, limiting flying to good air conditions, and the necessity of fixing the primary coil to the plane.

If the primary and pick-up coils could be placed together in a single bomb, and the direct effect of the primary field eliminated, then one would have overcome the problem of relative position of pick-up coil to primary coil, the problem of restricted flying, and the problem of ready transference of the apparatus from one type of aircraft to another.

One aspect of the present invention is directed to the provision of apparatus for airborne geophysical exploration, which apparatus provides a continuous measurement of the in-phase and out-of-phase secondary components at a selected low frequency, preferably 390 cycles per second, and which apparatus includes means for eliminating the direct primary field effect from a pick-up system that is located on the same airframe as the primary system.

The basis of eliminating the direct primary flux field from the pick-up coil system is to provide an auxiliary coil system which creates an auxiliary flux-field at the pick-up coil, which field is of substantially equal strength as the direct primary field but of opposite phase so as to buck out the effects of the direct primary field. The auxiliary coil is generally a single loop or turn of wire which carries the same exciting current as the primary coil and is positioned relatively near the pick-up coil. By proper orientation of the auxiliary coil and proper spacing from the pick-up coil, the effects of the direct primary flux field may be substantially eliminated in the pick-up coil. As can clearly be seen in FIG. 1, the magnetic moment (product of area times ampere-turns) of the auxiliary coil is considerably less than that of the primary coil, so that the auxiliary flux field does not affect the primary flux field at the location of the distant conducting body 10.

Figure 3:
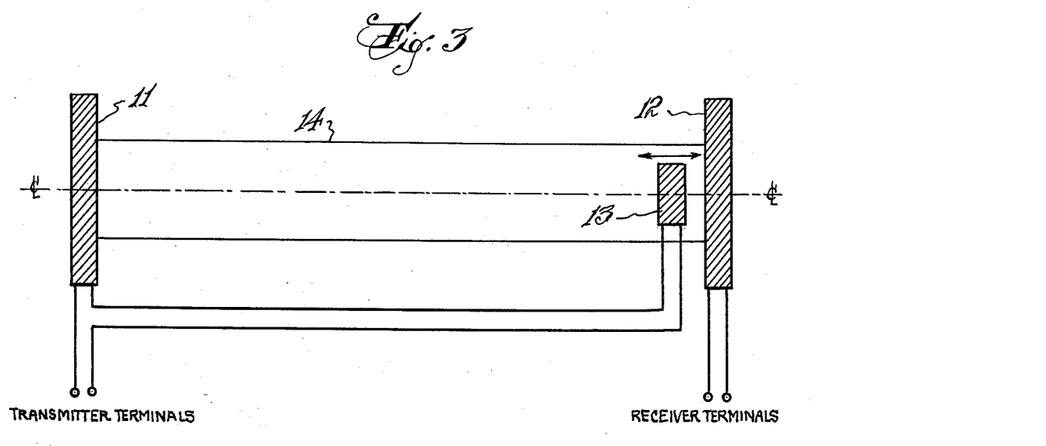
FIGURE 3 illustrates a coaxial primary pick-up and auxiliary coil arrangement wherein the coils are mounted on a supporting beam.

FIGURE 3 shows, in elevation one coil configuration wherein a primary coil 11 and a pick-up coil 12 are coaxially arranged on opposite ends of ten to twenty-five foot boom 14. A small auxiliary coil 13 is connected in series with the primary coil 11 and is coaxially oriented with, and closely coupled to, the receiver coil 12. The small auxiliary coil carries the same current as the primary coil 11. The system is adjusted by varying the position of the auxiliary coil 13 along the axis relative to the pick-up coil 12, until the mutual inductive coupling between the auxiliary coil and the pick-up coil is exactly equal in magnitude but opposite in sign to the mutual inductive coupling between the primary coil and the pick-up coil. This results in zero voltage induced in the receiver coil, and, in effect, zero direct coupling between the primary coil system and pick-up coil. This zero coupling is maintained regardless of frequency or amplitude changes in the primary coil exciting current or small changes in the resonant frequency of the pick-up coil system.

Figure 4:
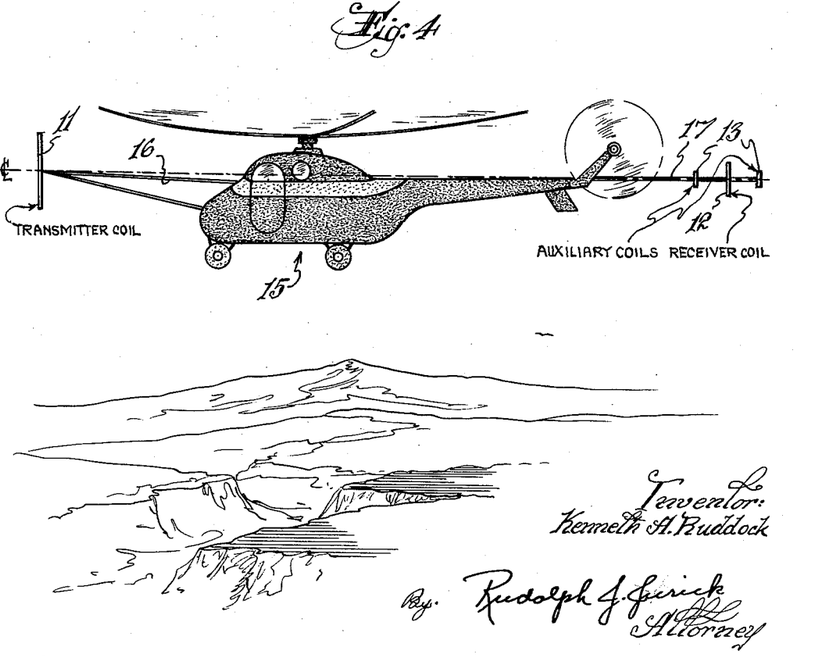
FIGURE 4 is similar to FIGURE 3 and illustrates the coaxially arranged coils wherein the coils are mounted on a helicopter.

Another useful coil configuration is shown in FIGURE 4. Again the coils are arranged coaxially but an aircraft 15, shown as a helicopter in the drawing, is used as the supporting structure thereby resulting in a coil separation of fifty to sixty feet. With the coils carried directly on the aircraft as shown in FIGURE 4 it has been found essential to mechanically isolate the receiver coil from the helicopter structure. With the helicopter engine running and the rotors turning there is always present a complex system of vibrations. If the receiver coil is allowed to vibrate in the earth's magnetic field there will be induced in the coil a voltage proportional to the rate at which the total flux through the coil changes. Such a voltage can constitute a very serious interference problem if the receiver coil is not prevented from following the vibrations of the helicopter structure. Vibration insulators or shock mounts as they are called are used to mount the receiver coil and are very effective in reducing the vibrations transmitted to the coil. However, supporting the receiver coil on these flexible mounts creates a further problem. As the receiver coil moves on the mounts it changes its position relative to the transmitter and auxiliary coils. This, in effect, moves the receiver coil out of the point of zero net magnetic flux and results in an in-phase signal voltage induced in the receiver coil. This would represent a serious source of interference or noise.

In order to eliminate interference of this type an improved auxiliary coil system was developed as shown in FIGURE 4. In this system the auxiliary flux field, necessary to cancel the direct primary flux field, is produced by two separate auxiliary coils on opposite sides of the receiver coil. The two coils, which in this particular case consist of a single turn each, are connected in series and both carry the same current as the transmitter coil. The phasing is such that the flux resulting from each of the coils tends to cancel the primary flux field at the receiver coil. The spacing between the receiver coil and the auxiliary coils is so adjusted that there is practically zero net flux at the receiver coil and in a region around the coil. Thus the receiver coil is free to move or rotate on the flexible shock mounts without getting out of the region of zero net flux. Hence there is no voltage induced in the receiver coil as a result of the coil moving on the flexible mounts, and the condition of zero mutual inductive coupling between the primary coil system and the pick-up coil is maintained.

In a coil system such as shown in FIGURES 3 and 4, the primary and pick-up coils are mounted at opposite ends of a rigid structure and there will be an appreciable, but slow, change of separation of the coils with changes in temperature, as the supporting structure expands or contracts. Provision is made in the apparatus to compensate for such slow drifts, by automatically zeroing the pick-up coil voltage. A shift in the steady state relative positions of the coils is compensated for by this automatic zeroing feature which will be described in detail later on in the specification.

A more serious type of relative motion is the transient type resulting from vibrations of the aircraft or from bending of the aircraft structure as it is maneuvered along a flight line or encounters turbulent air. The changes in pick-up coil induced voltage, resulting from these transient motions, may have about the same characteristics as voltage changes resulting from a passage over a conducting ore body. It is thus necessary to keep such motions at an absolute minimum, and to so arrange the coil system that the pick-up coil induced voltage is an insensitive as possible to such transient motions.

By mounting the coils on a very rigid structure, such as the boom 14 or the helicopter 15 as shown, transient motions are kept to a minimum. As shown in FIGURE 4, the primary coil is supported approximately 10 feet in front of the nose of the helicopter on a coil support 16 and the pick-up coil is mounted approximately 8 feet to the rear of the end of the tail cone of the helicopter on coil support 17. Both coil supports are carefully designed and constructed in order to achieve a high degree of mechanical stability. The type of helicopter used is particularly well suited to the application in that it has sufficient overall rigidity to maintain the necessary mechanical tolerances under flight conditions.

By orienting the coils in a coaxial manner, the pick-up coil induced voltage is made quite insensitive to the above-mentioned transient motions resultsing from vibrations and bending of the aircraft structure. The following analysis of the voltage induced in a pick-up or receiver coil which is coaxially positioned with respect to a primary, or transmitter, coil will illustrate the reason the receiver coil is insensitive to such transient motions.

The mutual impedance between coaxial coils situated in free space can be taken as $$Z_0 = \frac{2 \times 10^{-7} \omega N_1 N_2 A_1 A_2}{\rho^3} \text{ in mks. units}$$

where:

$\omega$ is the angular frequency,
$N_1$ is the number of turns on the transmitter or primary coil,
$A_1$ is the area in square meters of the transmitter coil,
$N_2$ is the number of turns on the receiver or pickup coil,
$A_2$ is the area in square meters of the receiver coil, and
$\rho$ is the coil separation in meters.

The voltage induced in the receiver coil in free space is then simply the product of the transmitter coil current $I$ and this mutual impedance $Z_0$. For any given pair of coils and a constant operating frequency the receiver coil induced voltage can be taken as $$E_0 = I Z_0 = \frac{IK}{\rho^3}$$

where $K$ is a constant given by $2 \times 10^{-7} \omega N_1 N_2 A_1 A_2$. Thus the receiver coil induced voltage is very susceptible to small changes in the coil separation. Taking differentials $$\Delta E_0 = \frac{-3IK}{\rho^3} \cdot \frac{\Delta \rho}{\rho}$$

which indicates that the percentage change in separation $\rho$, to produce a definite change $\Delta E_0$ in the induced voltage varies directly as the third power of the separation distance. In the embodiment wherein the transmitter and receiver coils are mounted on a helicopter, a relatively large separation of about fifty to sixty feet is used to take advantage of this fact. Rotation of either coil in such a manner as to depart from a true coaxial condition will result in a decrease in induced voltage in the receiver coil in accordance with a cosine law.

In order to achieve the desired sensitivity of the prospecting apparatus it is necessary that changes in induced voltage resulting from relative motions between the coils be not in excess of ±25 microvolts. From this limit the allowable tolerances on the mechanical dimensions can be obtained. For the transmitter current and the coils used in the apparatus, the limits on the coil separation and rotations taken separately are ±.040 inch and about ±1°. However it is fortunate that the most common type of relative motion, that caused by bending of the tail cone of the helicopter, causes a receiver coil displacement which can be treated as three component displacements, the effects of which tend to cancel.

The three component displacements resulting from a bend in the tail cone are:

(1) A reduction in the separation which results in an increase in $E_0$.

(2) A rotation of the receiver coil about an axis perpendicular to the axis of the transmitter coil. This results in a decrease in $E_0$.

(3) A displacement of the center point of the receiver coil off the axis of the transmitter coil. This results in a decrease in $E_0$.

Because of this cancellation, the net effect of tail cone bending does not cause a change in $E_0$ in excess of the allowable ±25 microvolts unless the tail cone bend is greater than about 2°. Under normal flight conditions it has been found that the tail cone stability of the helicopter is quite sufficient to meet these requirements.

The presence of the large metal helicopter between the transmitter and receiver coils violates the free space condition described above. This in effect results in a mutual inductive impedance $Z_1$ between the two coils that is different from the theoretical value $Z_0$. This different mutual impedance is shown by a change in the receiver coil voltage.

$$Z_1 = \frac{E_0 + E_h}{I}$$

where:

$Z_1$ is the mutual inductive impedance between the coils,
$E_0$ is the receiver coil induced voltage in free space,
$E_h$ is the change in receiver coil induced voltage resulting from the presence of the helicopter,
$I$ is the transmitter coil current.

The receiver and transmitter coils are mounted by means of very rigid supports to the helicopter frame in order that there be no motion between either of the coils and the metal helicopter. In this way $E_h$ is maintained very constant during flight. This is necessary as any variation in $E_h$ could appear on the final record of receiver coil voltage either as an undesired signal or as noise which could obscure any true signals resulting from conducting bodies.

The voltages $E_0$ and $E_h$ are, of course, vector quantities, but it happens for the coils mounted as they are on the helicopter that $E_h$ is very nearly in-phase with $E_0$. The small out-of-phase component of $E_h$ can be readily compensated by an out-of-phase zeroing control, which control will be described in detail later.

As the apparatus is flown over a highly conducting body there results a secondary flux field due to eddy current flow in the conducting body. This secondary flux field gives rise to an induced voltage $E_s$ in the receiver coil. This voltage $E_s$ in effect causes a variation in the mutual inductive coupling between the receiver and transmitter coils. It is this voltage $E_s$, taken as the indication of the presence of conducting formations in the earth, which must be measured and recorded. The mutual inductive impedance in the presence of a conducting body is given by $$Z_2 = \frac{E_0 + E_h + E_s}{I}$$

The voltage $E_s$ is a vector quantity and normally will have both in-phase and out-of-phase components, the relative amplitude of which will depend on the nature of the conducting body and on the operating frequency. Thus $$E_s = e_{si} + j e_{so}$$

where:

$E_s$ is the change in the receiver coil induced voltage resulting from the presence of a conducting body. It is a vector quantity and is referred to as the signal voltage.
$e_{si}$ is that component of the signal voltage which is in-phase with the transmitter coil current.
$e_{so}$ is that component of the signal voltage which is out-of-phase with the transmitter coil current.

The apparatus of this invention provides means of measuring and continuously recording the values of $e_{si}$ and $e_{so}$ as the helicopter bearing the equipment is flown over the area under investigation.

Figure 5:
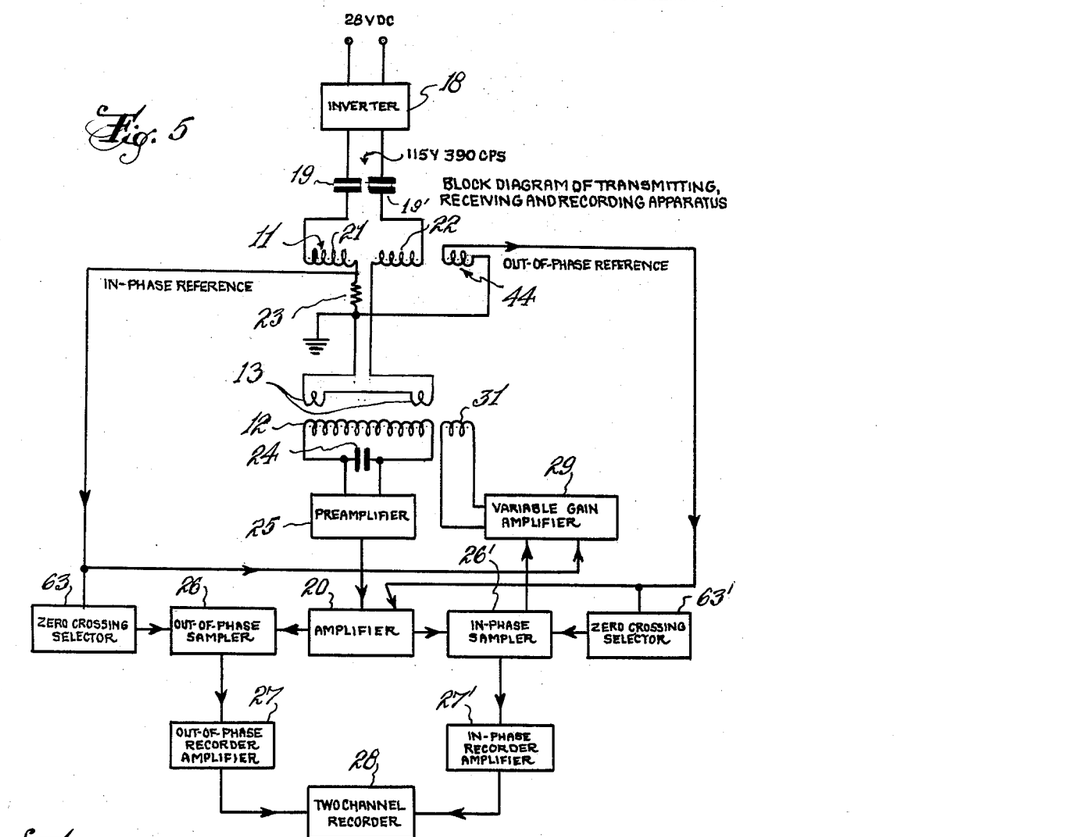
FIGURE 5 is a block diagram illustrating my sending, receiving and recording apparatus.

Reference is now made to FIGURE 5 which is a block diagram of the apparatus. The source of current for the transmitter, or primary, coil is a 390 cycle per second inverter 18 which is driven from the aircraft 28 volt D.C. electrical system. The out-put of the inverter is 115 volts, 6.5 amperes at a constant frequency of 390 cycles per second. Two high voltage A.-C. capacitors 19, 19' are connected in series with the transmitter coil making the combination series resonant at about 405 cycles per second. Maintaining the operating frequency on the low side of the resonance curve has a frequency regulating effect on the inverter output. For instance, should the inverter speed tend to increase the operating point will move up the resonance curve increasing the current. Thus the power taken from the inverter, as determined $I^2R$, increases. Conversely the load on the inverter decreases if its speed tends to decrease. This action is quite effective in maintaining the inverter output frequency constant.

The transmitter coil 11 is divided into two identical sections 21 and 22, each consisting of 87 turns of #14 aluminum magnet wire wound on a square form 4.2 feet per side. The two sections are connected in series through a 2 ohm resistor 23 and an auxiliary coil 13 comprising two single turn loops which are mounted in close proximity with the receiver coil 12. The center tap position is a more suitable point to insert the auxiliary coil than one end of the transmitter coil. There is a distributed capacitance across the transmitter coil which results in the actual primary coil current differing slightly from the line current in both phase and harmonic content. By using the center tap, the same current flows through the 2 ohm resistor and the auxiliary coil as flows through the transmitter coil. The voltage of about 13 volts across the 2 ohm resistor is exactly in phase with the current in the transmitter coil, and will be referred to as the "in-phase reference voltage."

A three turn coil 44 of coaxial cable is found in close coupling with the transmitter coil, with the outside conductor used as a capacitive shield. There is induced in this coil approximately 17 volts R.M.S. that is out-of-phase with the transmitter coil current, and will be referred to as the "out-of-phase reference voltage."

The utilization of the single turn auxiliary coil closely coupled to the receiver coil, and both the in-phase and out-of-phase reference voltages will be described later in the description of the apparatus.

The receiver section as shown in the block diagram of FIGURE 5 consists of:

(1) A receiver coil 12 tuned to resonance at the operating frequency by the capacitor 24,
(2) A preamplifier 25,
(3) An amplifier 20 having two identical output connections,
(4) Two samplers 26 and 26',
(5) Two recorder driver amplifiers 27 and 27',
(6) A two channel recorder 28,
(7) A variable gain amplifier 29, and
(8) Two zero crossing selectors 63 and 63'.

As previously outlined there is induced in the receiver coil 12 a voltage given by $E_0+E_h+E_s$ and its is desired to measure the signal voltage $E_s$. In the absence of any conducting body the receiver coil voltage, resulting from the mutual inductive impedance between the transmitter and receiver coils, is $E_0+E_h$. This voltage is substantially in phase with the transmitter coil current. It is thus possible to adjust the position of the single turn loops relative to the receiver coil such that the current in the loops will induce a voltage in the receiver coil equal to $E_0+E_h$ but of substantially opposite phase.

This receiver coil voltage null is, of course, temperature sensitive since the spacing between the coils varies as the separating structures expand and contract with changes in temperature. For example, a temperature change of $+25°$ C. will cause a departure from a null voltage of about 150 microvolts. It is the fuction of the variable gain amplifier 29 and a feed-back coil 31 which is connected to the output of the variable gain amplifier and closely coupled to the receiver coil 12, to compensate for such changes in the relative position of the coils, by maintaining a nearly true null balance in the receiver coil voltage. The variable gain amplifier and its associated circuitry compensate for the in-phase component of such changes in voltage as occur with changes in temperature but does not effect the small out-of-phase component. Included in the variable gain amplifier is a coupling circuit having a very long time constant which prevents the amplifier from operating on, and nulling, relatively fast transient changes in receiver coil voltage. The signal voltage $E_s$ induced in the receiver coil as the equipment passes over a conducting body normally will build up to a maximum and decay to zero in a time of the order of a few seconds. An induced voltage of this form is relatively unaffected by the variable gain amplifier nulling action and will appear across the receiver coil terminals unchanged in amplitude. However, any change in the receiver coil induced voltage due to slow changes in the relative position of the primary and receiver coils such as occur by reason of temperature changes will be substantially cancelled from the receiver coil.

Thus the voltage appearing across the receiver coil output terminals is substantially the desired signal voltage $E_s$. The in-phase components of $E_0+E_h$ are cancelled by the action of (1) the auxiliary coil 13 which is in series with the transmitter coil 11, and (2) the feed-back coil 31 which is connected to the output of the variable gain amplifier.

As mentioned above, $E_h$, the change in the receiver coil induced voltage resulting from the presence of the helicopter, contains a small out-of-phase component and this component is not compensated for by either the auxiliary coil 13 or the feedback coil 31. The small out-of-phase component is compensated for, however, later on in the receiver system by feeding an out-of-phase reference voltage component into the system which is equal to, but of opposite effect than, the out-of-phase component of $E_h$ in the receiver system. The manner in which this is achieved and the way the in-phase component of $E_0+E_h$ is cancelled by use of the auxiliary and feedback coils will be explained more fully below in the detailed description of the receiver circuitry.

In order to obtain a suitable output signal voltage which may be recorded, the voltage across the receiver coil is amplified successively by the preamplifier 25 and the amplifier 20. The amplifier has two low impedance outputs which feed the out-of-phase sampler 26 and the in-phase sampler 26'. The output of the out-of-phase sampler is a voltage proportional to the peak amplitude of the out-of-phase component of the signal voltage $E_s$, that is $e_{so}$; while the output of the in-phase sampler is a voltage proportional to the peak amplitude of the in-phase component of the signal voltage $E_s$, that is $e_{si}$. The output voltage of each sampler is amplified by recorder amplifiers 27 and 27' respectively and then recorded on individual channels of a two channel recorder 28. Thus a permanent record of the in-phase and out-of-phase voltage components of the signal voltage $E_s$ is obtained. This record is then used to determine the presence, or absence, of an ore body.

Figure 6:
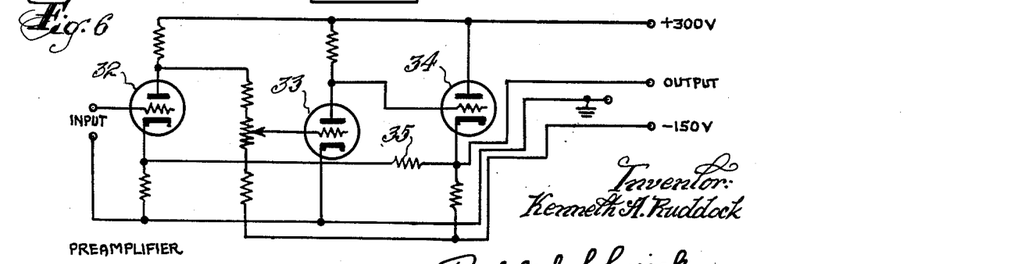
FIGURE 6 is a circuit diagram of the preamplifier used to amplify the voltage induced in the pick-up coil system.

FIGURE 6 is a circuit diagram of the preamplifier. The circuit is a direct coupled amplifier with feedback and consists of two stages of amplification followed by a cathode follower low impedance output stage. Triodes 32 and 33 are used in the two stages of amplification while triode 34 is connected as a cathode follower. A feedback resistor 35 is connected between the output of the cathode follower and the cathode of the triode 32 in the first stage of amplification and provides negative feedback in the preamplifier. The feedback resistor 35 is chosen of such a value as to give a stable gain of about 157 from input to output. The preamplifier is of conventional design and a more detailed description is believed to be unnecessary. It is here pointed out, however, that the preamplifier is located near the end of the support 17 and closely adjacent the pick-up coil 12 so as to maintain the leads between the pick-up coil and preamplifier short. The output impedance of the preamplifier is of the order of 15 ohms so that there is negligible phase shift caused by the capacitive shunting of the coaxial cable lead which connects the output of the preamplifier 25 to the input of the amplifier 20.

Figure 7:
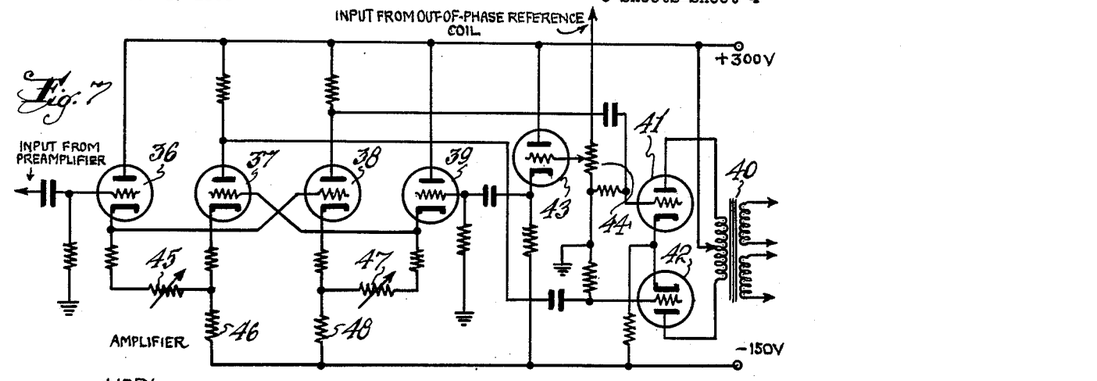
FIGURE 7 is a circuit diagram of the amplifier used to amplify the signal from the preamplifier.

FIGURE 7 is a circuit diagram of the amplifier 20. The amplifier comprises a cross coupled amplifier, including tubes 36, 37, 38 and 39, which feeds an amplifier, including tubes 41 and 42, the plates of tubes 41 and 42 being connected in push-pull to a transformer 40. A cathode follower, which includes tube 43, isolates the input from the out-of-phase reference voltage source from the cross-coupled amplifier.

The cross-coupled amplifier is provided with two inputs; one from the preamplifier which is coupled to the input grid of the tube 36, and, the other from the out-of-phase reference coil 44 which is coupled to the input grid of the tube 39 through a potentiometer 44 and the cathode follower tube 43. The input signal voltage which is supplied by the preamplifier 25 is applied to the input grid of the tube 36, and then by appropriate connection to its cathode circuit, to the grid of tube 38 and the cathode of tube 37. The circuit is designed to act as a very precise phase inverter under these conditions. Thus amplified push-pull signals appear at the plates of tubes 37 and 38. These push-pull signals are then coupled to the grids of tubes 41 and 42, said tubes together with transformer 40 forming a push-pull amplifier.

A signal applied to the second input of the cross-coupled amplifier, that is to the grid of tube 39 will similarly result in an amplified push-pull signal across the grids of tubes 41 and 42.

It can be shown, and is generally known by those versed in the art, that the cross-coupled amplifier, when properly adjusted, is capable of a very high degree of common-mode rejection. That is any signal, or component of signal that is applied equally to both input grids, will not appear in the out-put voltage at the plate of either tube 37 or tube 38. The cross-coupled amplifier is adjusted for this high common-mode rejection by the very precise setting of resistors 45 and 47.

The signal which is fed from the preamplifier 25 to the one input of the cross-coupled amplifier contains a small out-of-phase component resulting from the presence of the helicopter between the transmitter and receiver coils. As previously mentioned, the so called helicopter signal, $E_h$, is mostly in-phase but there is also a small out-of-phase component. This out-of-phase component is removed by feeding an equal out-of-phase voltage to the second input grid of the cross coupled amplifier. This out-of-phase voltage is obtained from the out-of-phase reference coil and fed through the potentiometer 44 and the cathode-follower tube 43 to the second input grid of the cross-coupled amplifier. The potentiometer is adjusted to give zero out-of-phase signal as shown on the recorder when there is no signal voltage, $E_s$, induced in the pick-up coil. A no signal voltage condition may be obtained by taking the helicopter up to a sufficiently high altitude so that no signal voltage is induced due to conducting bodies in the ground.

The gain of the amplifier from the input to either of the identical output windings of the transformer 40 is twenty. Each of the outputs is at a low impedance level, suitable for driving the samplers 26 and 26' which follow in the circuit.

The samplers are designed to take an amplitude sample of the input signal waveform at an instant of time determined by a trigger or gate pulse input to the sampler and to hold the amplitude sample so taken until the next trigger pulse which initiates the taking of the next sample.

Figure 8:
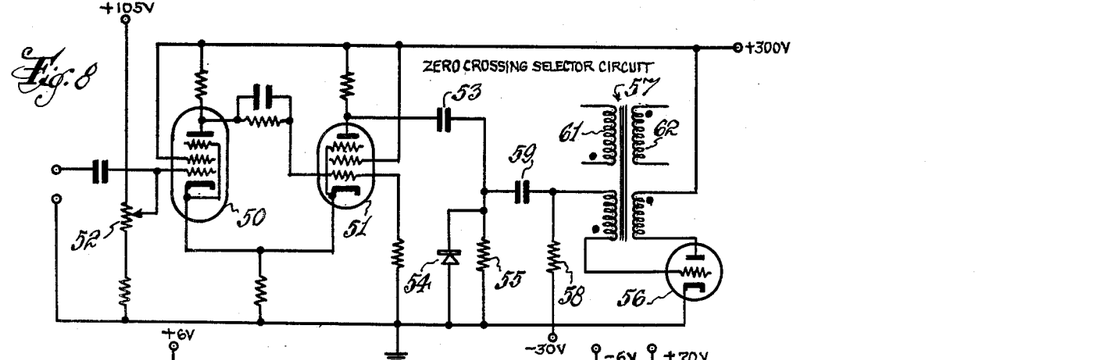
FIGURE 8 is a circuit diagram showing the zero crossover circuit used to trigger the sampling circuit.

The zero crossing selector circuit shown in FIGURE 8 of the drawings supplies the necessary trigger or gate pulses for the samplers. One such circuit is driven by the out-of-phase reference voltage and provides the gate pulse for the in-phase sampler. A second identical circuit is driven by the in-phase reference voltage and provides the gate pulse for the out-of-phase sampler.

Each zero crossing selector circuit consists of a Schmitt trigger circuit followed by a monostable blocking oscillator. Referring to FIGURE 8, the trigger circuit comprises two pentodes 50 and 51 connected in such a way that the circuit has two stable states, each of which corresponds to one pentode conducting and the other cut-off. A very rapid transition from one stable state to the other can be caused by the sine wave input signal on the grid of the pentode 50. As the input voltage increases through a critical value the pentode 50 switches from non-conducting to conducting. The coupling of the signal from the plate of the pentode 50 to the grid of the pentode 51 causes the pentode 51 to simultaneously switch from conducting to non-conducting. As the input signal decreases through a second critical value the opposite occurs; that is the pentode 50 switches from conducting to non-conducting and the pentode 51 simultaneously switches from non-conducting to conducting. The plate voltage waveform of the pentode 51 is thus a square wave having very fast transitions from one level to the other.

The alternating current reference voltage input to the grid of the pentode 50 is connected in series with an adjustable direct current biasing voltage which is supplied from a positive 105 volt source through the potentiometer 52. By adjusting the potentiometer it is possible to obtain a bias voltage such that the critical value of grid voltage is reached just as the A.-C. reference signal voltage passes from negative to positive through its zero value. This results in a fast positive going step of voltage at the plate of the pentode tube 51 which corresponds in time with the positive going zero crossing of the A.-C. reference signal voltage. This positive going step is differentiated by a capacitor 53 and the parallel connected diode 54 and resistor 55.

The following stage, consisting of a triode 56 and the four-winding pulse transformer 57, forms the monostable blocking oscillator. The grid of the triode 56 is normally held just below cut-off by a negative thirty volt biasing source connected through a resistor 58. The positive pulse from the previous stage is coupled to the blocking oscillator by a capacitor 59. The operation is such that the blocking oscillator is triggered at the exact instant the input sine wave voltage passes through its zero value. It will be noted that the blocking oscillator transformer has two output windings, 61 and 62, the utilization of which will be described hereinbelow.

Figure 12:
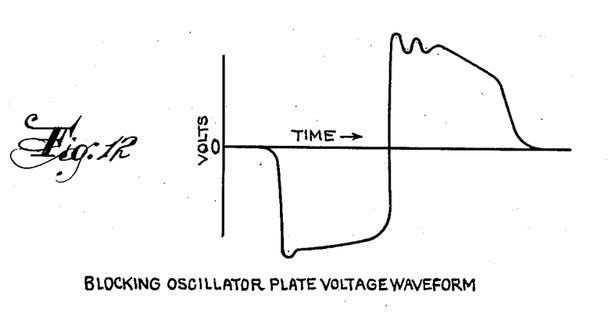
FIGURE 12 is an oscillograph trace showing the plate voltage waveform of the blocking oscillator.

FIGURE 12 shows the waveform of the blocking oscillator plate voltage. The negative half cycle is the actual blocking oscillator pulse and is about three micro-seconds duration. The positive half cycle is the overshoot and it too is of approximately three micro-seconds duration.

As shown in the block diagram of FIGURE 5, the in-phase and out-of-phase reference voltages, obtained from the resistor 23 and the reference coil 44 respectively, are applied to the zero crossing selectors 63, 63', which trigger the out-of-phase and in-phase samplers 26, 26'. The in-phase reference voltage is also applied to the variable gain amplifier while the out-of-phase reference voltage is also applied to the amplifier 20 for the purpose of removing the out-of-phase component of $E_h$ as described above in the description of the amplifier circuit. It will be also noted that the output of the amplifier is applied directly to the in-phase and out-of-phase samplers.

Figure 9:
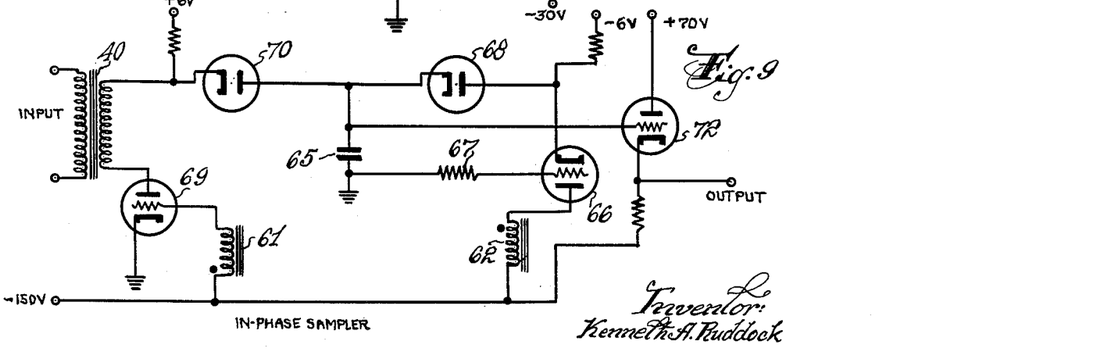
FIGURE 9 is a diagram of the in-phase sampling circuit.

The circuit for the in-phase sampler of FIGURE 5 is shown in FIGURE 9. It may be here stated that the out-of-phase sampler differs only in that its trigger signal is 90 degrees out of phase with the signal that triggers the in-phase sampler. The A.-C. signal output, $E_s$, from the amplifier 20 is coupled to the in-phase sampler 26' by means of a transformer 40. The two blocking oscillator output windings 61 and 62 of the zero crossing selector 63' are also coupled to the sampler circuit as shown in FIGURE 9 of the drawings. A capacitor 65, of 150 $\mu\mu$fds., is the sample holding capacitor which holds the amplitude sample between successive sampling instants.

The blocking oscillator transformer winding 62 is so connected that the plate of the triode 66 is driven positive during the main blocking oscillator pulse. The grid of the triode 66 is held at ground potential through a resistor 67, therefore the triode 66 will conduct during the positive pulse. A diode 68 is connected in series with the sample holding capacitor 65 to the cathode of the triode 66. Therefore, as the triode 66 conducts on the positive pulse, the capacitor 65 will charge up rapidly through the triode 66 and diode 68 and so raising the potential on the cathode of the triode 66 to the point where the tube is cut-off. This process goes to completion before the end of the positive blocking oscillator pulse. During the blocking oscillator overshoot pulse the plate of the triode 66 is driven negative and the tube remains cut-off.

The blocking oscillator transformer winding 61, on the other hand, is so connected that the grid of the triode 69, to which the winding is connected, is driven positive during the overshoot pulse. Connected in series with the triode 69 is the signal voltage $E_s$ by means of the transformer 40, a diode 70, and the now charged sample holding capacitor 65. The voltage across the charged capacitor 65 is always greater than the peak voltage of $E_s$ such that the plate of the triode 69 is positive with respect to its cathode. Thus the triode conducts with a very low internal impedance during the overshoot pulse. This discharges the capacitor 65 until the voltage across the capacitor is equal to the instantaneous value of $E_s$, at which time the voltage across triode 69 is reduced to zero and the discharge stops. This process goes to completion before the end of the blocking oscillator overshoot pulse. During the remainder of each cycle the grid of the triode 69 is held negative and the triode is held cut-off. Thus the positive blocking oscillator pulse clears the holding capacitor 65 of the previous sample and the overshoot pulse causes a new sample to be taken and held. All of this is accomplished in approximately 6 microseconds. During the relatively long time interval, of over 2,500 microseconds, between taking samples the diodes 68 and 70 are biased so that the plates are negative with respect to the cathodes, therefore, no current flows through the diodes to discharge the sample holding capacitor 65. The grid of a triode 72 is connected to the capacitor 65. The triode 72 is connected as a cathode-follower therefore, the sampler voltage output appears at the cathode of the triode 72.

The signal input to both samplers is the signal voltage $E_s = e_{si} + je_{so}$. The reference signal input to the zero cross-over selector circuit 63' which actuates the in-phase sampler 26' is the out-of-phase reference voltage. The bias on the zero cross-over selector circuit 63' is adjusted so that the blocking oscillator is triggered just as the out-of-phase reference voltage passes through its zero value. The blocking oscillator pulse and the overshoot pulse actuate the in-phase sampler and cause an amplitude sample of $E_s$ to be taken at the instant that the $e_{so}$ component is zero and the $e_{si}$ component is at its peak value. Therefore, the output of the in-phase sampler is a voltage proportional to $e_{si}$; the in-phase component of $E_s$.

The out-of-phase sampler 26 is actuated by a similar zero cross-over selector circuit 63 but the reference signal input to this zero cross-over circuit is the in-phase reference voltage. Thus, the out-of-phase sampler is caused to take an amplitude sample of $E_s$ at the exact instant that the in-phase reference voltage and $e_{si}$ pass through their zero values. Therefore, the output of the out-of-phase sampler is a voltage proportional to $e_{so}$; the out-of-phase component of $E_s$.

Figure 11:
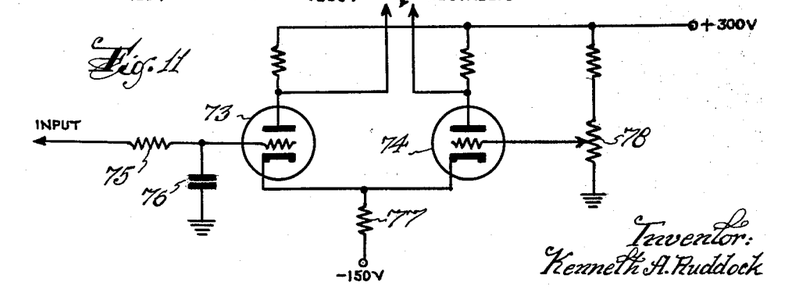
FIGURE 11 is a circuit diagram of the recorder amplifier.

The output voltages of the in-phase and out-of-phase samplers are amplified by identical in-phase and out-of-phase recorder amplifiers, 27' and 27 respectively. The circuit diagram of one of the recorder amplifiers is shown in FIGURE 11 of the drawings. The amplifier comprises a pair of direct coupled amplifier stages 73, 74. The sampler output voltage is connected to the input grid of the triode 73 through a low pass filter consisting of a series resistor 75 and capacitor 76 to ground. The time constant of the combination is about 0.3 second. The combination of a sampler which operates at the signal frequency followed by a low pass filter acts as a very narrow band pass filter, which is very effective in removing power line interference and random noise from the signal before being passed on to the recorder. Triode 73 is coupled to the second triode 74 of the recorder amplifier by means of a common, unbypassed, cathode resistor 77. The D.-C. bias potential on the grid of the triode 74 is variable by means of a potentiometer 78 located between a positive D.-C. voltage and ground. The potentiometer may be adjusted to bring the corresponding recorder pen to its zero center position in the absence of a signal.

The output of the in-phase and out-of-phase recorder amplifiers are applied to a two channel recorder 28 which comprises an ordinary dual recording milliammeter whereby a permanent record of the in-phase and out-of-phase components of the signal voltage $E_s$ may be made. The recorder 26 is equipped with an event marker by means of which it is possible to put identifying marks on the recorder chart as recognizable features on the ground are crossed. Thus, the recorded magnitudes of in-phase and out-of-phase signals can be coordinated with ground positions. Areas giving promising anomalies on the airborne equipment can be identified and further careful investigation can be made on the ground.

To complete the description of the apparatus used to carry out the method of this invention, an explanation of the variable gain amplifier 29 and feed back coil 31 is necessary. Without the variable gain amplifier and feed back coil in the receiver circuit it would be necessary to place the auxiliary coil 13, which is in series with the transmitter coil 11, in such a position with respect to the receiver coil 12 so as to exactly cancel the voltage $E_0+E_h$ from the receiver coil. In other words, it would be necessary to maintain the mutual impedance between the transmitter and receiver systems exactly zero in the absence of any conducting body. This condition cannot normally be maintained over any period of time due to temperature changes, etc. Thus there will normally be induced in the receiver coil some fraction of $E_0+E_h$, and the amplitude of this residual will be subject to slow drifts as changes in the mechanical structure effect the electrical balance. The voltage $E_0+E_h$ is almost entirely in-phase with the transmitter coil current. Any small out-of-phase component in $E_h$ is cancelled as outlined above in the description of the amplifier 20. The in-phase fraction of $E_0+E_h$ that remains after the buck-out action of the auxiliary coil will be referred to as $E_r$. If means were not taken to eliminate this voltage $E_r$ induced in the receiver coil it would cause a displacement of the in-phase recorder pen. It is very possible for this voltage $E_r$ to become large enough to run the recorder pen off scale or even to cause overloading of the amplifiers. The variable gain amplifier 29 and a small feedback coil 31 coupled to the receiver coil 12 are used to prevent this, by nearly cancelling $E_r$ in the receiver coil. Thus the function of the variable gain amplifier and the feedback coil is to very nearly eliminate from the receiver coil voltage any in-phase component not having the rapidly changing characteristic of a desired signal.

Figure 10:
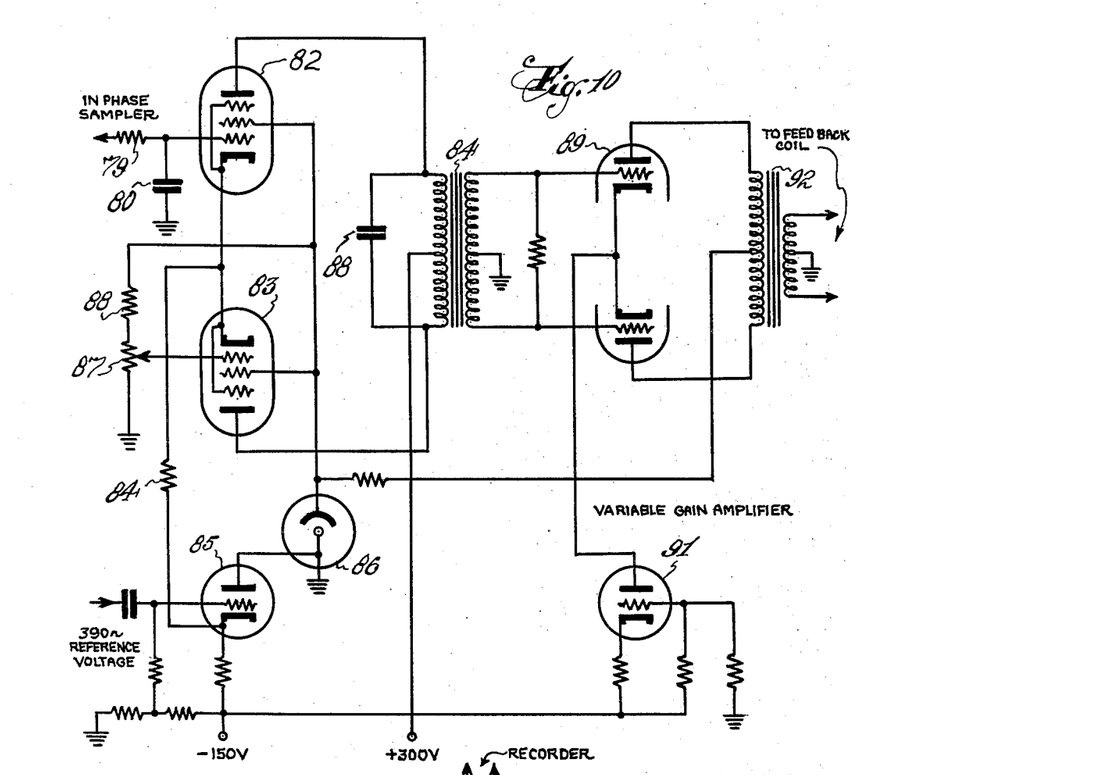
FIGURE 10 is a circuit diagram of the variable gain amplifier.

The circuit diagram of the variable gain amplifier is shown in FIGURE 10. The output of the in-phase sampler is connected to the variable gain amplifier input through a very long time constant filter. This filter consists of a series resistance 79 and a capacitance 80 to ground with an RC product of about 10 seconds. Because of the long charging time of the capacitance, any relatively short time duration signal voltages at the output of the in-phase sampler do not appear at the input to the variable gain amplifier. However, any steady voltage component in the in-phase sampler output will be coupled without attenuation to the variable gain amplifier input.

The variable gain amplifier circuit consists of two pentodes 82, 83 with their plates connected in push-pull to an interstage transformer 84. The cathodes of the two pentodes are connected together and through a resistor 104 to the negative return point provided by the output of a triode cathode follower 85. The 390 cycle in-phase reference voltage is applied to the grid of the cathode follower 85, and appears at the cathode output terminal. Constant screen voltage for the pentodes is maintained by a voltage regulator tube 86. A steady component of the in-phase sampler output is applied to the control grid of one of the pentodes 82. The D.-C. potential of the control grid of the other pentode 83 is variable by means of a potentiometer 87 which is connected to the regulated screen voltage source through a resistor 88. The potentiometer is adjusted so that the two pentodes are so biased that their transconductances are equal in the absence of a steady component in the in-phase sampler output voltage. The resulting signal currents in each half of the split primary transformer winding will be equal and in-phase, resulting in zero output voltage across the secondary. The circuit is such that a voltage change on the input control grid will unbalance the pentode circuit and result in a 390 cycle in-phase voltage across the transformer secondary. The phase of this secondary signal is reversible through 180° depending on the polarity of the voltage change on the input control grid. A small trimmer condenser 88 is connected across the transformer primary to eliminate the small phase angle change that would otherwise be caused by the imperfect transformer.

The transformer secondary is connected to a dual triode differential amplifier 89 using a constant current triode 91 as the common cathode return. This results in high common mode rejection. The plates of the dual triode amplifier 89 are connected in push-pull to an output transformer 92. The secondary of the transformer is connected by a resistance network to the feedback coil 31 which is coupled to the receiver coil 12. The feedback phasing is such that the voltage induced in the receiver coil by the current in the feedback coil tends to cancel the above mentioned voltage component $E_r$.

The gain around the loop is such that the cancellation of $E_r$ is made about 95% complete. Thus, if an electrical unbalance exists such that $E_r$ is 200 microvolts the action of the variable gain amplifier and the feedback coil will reduce the $E_r$ to about 10 microvolts. The output of the sampler resulting from this 10 microvolts residual will be about 0.04 volt, and this will cause an unbalance of the variable gain amplifier resulting in a voltage across the output transformer. This voltage must cause sufficient in-phase current to flow in the feedback coil that there is induced by this current 190 microvolts to oppose the $E_r$ of 200 microvolts and leave a residual of 10 microvolts. While the 200 microvolts would be sufficient to run the in-phase recorder pen to nearly full scale the residual 10 microvolts will cause only one small scale division deflection or $\frac{1}{25}$ of full scale. This small shift from zero is negligible.

In any electromagnetic prospecting method using transmitter and receiver coils there exists the problem of measuring the signal voltage in the presence of a much larger voltage due to the direct mutual inductive coupling between the coils. In some other methods the voltage due to the direct mutual coupling is removed by an electrical subtraction of voltages following the tuned receiver coil and some preamplification. Such a subtraction or buckout method requires that both amplitude and phase adjustments must be made to get and maintain the desired null. These adjustments are frequency sensitive since both amplitude and phase of the voltage across the tuned receiver coil are frequency sensitive. Any drift in the operating frequency or in the receiver coil resonant frequency will require a new null setting by phase and amplitude adjustments.

In the method of this invention the mutual inductive coupling between the transmitter system and the receiver coil is reduced to zero within about $\pm\frac{1}{6}$ of 1% at all times. This is accomplished by the use of an auxiliary coil carrying exactly the same current as the transmitter coil and in relatively close coupling to the receiver coil. The position of the auxiliary coils relative to the receiver coil is so adjusted that the mutual inductive coupling between the auxiliary coil and the receiver coil is exactly equal to the mutual inductive coupling between the main transmitter coil and the receiver coil. However, the phasing is such that the resulting voltages induced in the receiver coil subtract giving a net zero voltage and hence zero mutual coupling between the receiver coil and the transmitter system. This method has the very great advantage that it is not frequency sensitive. Zero mutual coupling is maintained even though the operating frequency or receiver coil resonant frequency may vary. In fact zero mutual coupling exists even at the harmonics of the operating frequency.

In the event that a mechanical displacement, such as might result from a temperature change, causes a departure from exact zero mutual coupling by as much as the $\frac{1}{6}$ of 1% limit, there will be induced in the receiver coil about 250 microvolts of in-phase signal. If the operating frequency differs from the receiver coil resonant frequency there will result an out-of-phase component. The allowable limit is 10 microvolts out-of-phase error. For a receiver coil Q of two this means the difference in operating frequency and receiver coil resonant frequency can not differ by more than $\pm 4.5$ cycles. This tolerance is easily maintained. The 250 microvolts of in-phase voltage is 95% eliminated by the action of the variable gain amplifier and feedback coil as explained previously.

The apparatus described above thus measures and records the in-phase and the out-of-phase components of any signal voltage which may be induced in the receiver coil due to the proximity of any conducting body. From the recorded values of these components an interpretation can be made that will indicate not only the presence of such bodies but also something of the nature of the conducting body. This is the major problem of interpretation since many surface features of no commercial value will give anomalous results. From the relative magnitudes of the in-phase and out-of-phase responses it is possible to tell something of the conductivity and size of the conducting body. This may in many instances be sufficient information to distinguish between an ore body and a conducting surface feature. Such surface features might be lake margins, swamp sections, etc.

Figure 13:
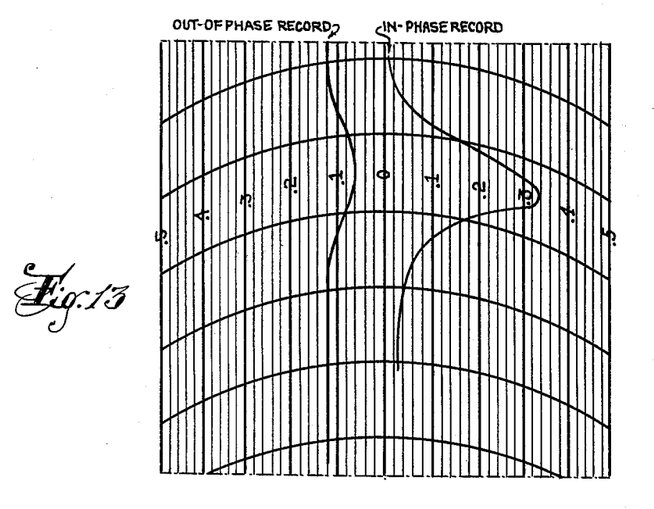
FIGURE 13 is a typical record obtained from the two channel recorder as the equipment is flown over an ore body.

A typical record obtained flying over an ore body is shown in FIGURE 13. The trace on the right is the record of the in-phase component and the trace on the left is the record of the out-of-phase component. For this particular ore body the in-phase peak is about five times the out-of-phase peak for a phase angle of about 11°. This type of signal would be expected from a large highly conducting body. It would be interpreted as an ore body rather than a surface feature which would usually have a phase angle of greater than 45°.

In summary, then, we have shown that by the method of this invention it is necessary to measure two quantities; namely, the magnitudes of the in-phase and out-of-phase components of the voltage signal induced in the receiver coils at a given frequency, in order to determine the nature of the body causing the electromagnetic anomaly. However, it will be apparent that the equipment may be suitably calibrated and the actual use thereof standardized whereby the relative magnitude of either the in-phase or out-of-phase signal component at the given frequency may be taken as indicative of the location of a conducting body.

The sampling technique employed in the invention described above, however, has a wide variety of uses in electromagnetic prospecting methods. The great advantage of the sampling method is that it can provide a measurement of the in-phase and out-of-phase components of a composite signal voltage. The in-phase amplitude measurement is independent of the amplitude of the out-of-phase component. Similarly the out-of-phase amplitude measurement is independent of the amplitude of the in-phase component. These facts suggest several other electromagnetic methods using the sampling technique which methods are briefly described below.

One of the main problems in the development of an airborne electromagnetic prospecting method is that of maintaining constant coupling between the transmitting and receiving coil systems. Any variation in the coupling, due to relative motion between the two coils, will result in an in-phase signal being induced in the receiver coil. However, any variation in the coupling does not result in any out-of-phase signal change in the receiver coil. These conditions apply for a receiver coil tuned to resonance at the operating frequency. From the above it can be seen that if only the out-of-phase signal component is to be measured then the coupling between the transmitter coil and the receiver coil can be allowed to vary. This requires of course that the out-of-phase component be measured in the presence of a large and varying in-phase component. The sampler shown in FIGURE 9 and described in detail above is capable of making this measurement, since it can accurately measure the out-of-phase component independent of the amplitude of the in-phase component. Thus it is possible to obtain a useful geophysical measurement without having the extremely rigid coil mounting described in the above invention. For example, it is possible to tow the receiver coil behind or below the aircraft in some form of bird. In such a case the bird will undergo large motions on the end of the tow line with respect to the transmitter coil but this will affect only the in-phase component and cause no error in the out-of-phase measurement. In order to obtain sufficient information to tell something of the nature of any conducting body causing an anomaly it would be advisable to employ two widely separated frequencies, say 390 and 1400 cycles per second, and to measure the out-of-phase signal at each frequency. These two measurements give almost the same information as is obtainable from the in-phase and out-of-phase signals at the single lower frequency.

Another possible method would use one transmitter coil and one frequency but would use two receiver coils at different elevations above the ground. For example, one receiver coil could be mounted on the aircraft and the second could be towed behind and appreciably below the aircraft. Both of these receiver coils would be connected to samplers so triggered as to measure the out-of-phase components of the received signals. With the results of these two measurements it is possible to distinguish between conducting surface features and long dyke-like sulphide ore zones which extend to greater depths. For a fixed transmitter coil position, it can be shown that the signal induced in a receiver coil varies inversely as the square of the height above a conducting surface feature, but only inversely as the height over the above mentioned type of ore body. Thus, for a helicopter flying at 100 feet with an attached receiver coil and a towed receiver coil 50 feet below, the out-of-phase signal in the upper coil will be ½ that of the lower coil over an ore body but only ¼ that of the lower coil over a flat conducting surface feature.

Having now described my invention in detail in accordance with the requirements of the patent statutes what I desire to protect by Letters Patent of the United States is set forth in the following claims.

I claim:

1. A method of establishing the presence of a conducting body which method comprises establishing a primary alternating magnetic flux field through a selected portion of the earth and through a pick-up coil, establishing an auxiliary alternating magnetic flux field through the pick-up coil of substantially equal strength and opposite sense to the primary magnetic flux field thereby establishing in the pick-up coil a field of substantially zero net direct magnetic flux, measuring the out-of-phase component of the resultant voltage induced in the pick-up coil by reason of eddy currents flowing in a conducting body disposed within the field of influence of said primary flux field, said primary flux field being substantially greater than said auxiliary flux field in the region of said conducting body, said out-of-phase component being measured at the instant the primary flux field passes through zero.

2. A method of establishing the presence of a conducting body which method comprises establishing a primary alternating magnetic flux field through a selected portion of the earth and through a pick-up coil, establishing an auxiliary alternating magnetic flux field through the pick-up coil of substantially equal strength and opposite sense to the primary magnetic flux field thereby establishing in the pick-up coil a field of substantially zero net direct magnetic flux, measuring the in-phase component of the resultant voltage induced in the pick-up coil by reason of eddy currents flowing in a conducting body disposed within the field of influence of said primary flux field, said primary flux field being substantially greater than said auxiliary flux field in the region of said conducting body said in-phase component being measured at the instant the primary flux field passes through its maximum.

3. A method of establishing the presence of a conducting body which method comprises moving a directly, mutually inductively coupled transmitter coil and receiver coil above the earth; passing an alternating current of predetermined magnitude and frequency through the transmitter coil thereby establishing a primary magnetic flux field through the earth and the receiver coil; substantially cancelling the primary magnetic flux field in the receiver coil with an auxiliary magnetic flux field; obtaining in-phase and out-of-phase signal voltage components induced in the receiver coil by reason of eddy currents flowing in a conducting body lying within the field of influence of the primary magnetic flux field but outside the field of influence of said auxiliary magnetic flux field, the said in-phase and out-of-phase components being taken as indicative of the presence of a conducting body lying within the field of influence of the primary magnetic flux field.

4. A method of establishing the presence of a conducting body which method comprises moving a directly, mutually inductively coupled transmitter coil and receiver coil above the earth; passing an alternating current of predetermined magnitude and frequency through the transmitter coil thereby establishing a primary magnetic flux field through the earth and the receiver coil; substantially cancelling the primary magnetic flux field in the receiver coil by means of an auxiliary magnetic flux field established by an auxiliary coil having a magnetic moment substantially less than that of said transmitter coil; obtaining in-phase and out-of-phase signal voltage components induced in the receiver coil by reason of eddy currents flowing in a conducting body lying within the field of influence of the primary magnetic flux field but outside the field of influence of said auxiliary magnetic flux field, the said in-phase and out-of-phase components being taken as indicative of the presence of a conducting body lying within the field of influence of the primary magnetic flux field.

5. A method of establishing the presence of a conducting body which method comprises moving a directly, mutually inductively coupled transmitter coil and receiver coil above the earth; passing an alternating current of predetermined magnitude and frequency through the transmitter coil thereby establishing a primary magnetic flux field through the earth and the receiver coil; passing the said alternating current through an auxiliary coil having a magnetic moment substantially less than that of said transmitter coil to establish an auxiliary magnetic flux field through the receiver coil which substantially cancels the effect of the primary magnetic flux field in the receiver coil; obtaining in-phase and out-of-phase signal voltage components induced in the receiver coil by reason of eddy currents flowing in a conducting body lying within the field of influence of the primary magnetic flux field but outside the field of influence of said auxiliary magnetic flux field, the said in-phase and out-of-phase signal voltage components being taken as indicative of the presence of a conducting body lying within the field of influence of the primary magnetic flux field.

6. A method of establishing the presence of a conducting body which method comprises passing an alternating current of predetermined frequency and magnitude through a transmitter coil to thereby establish a primary magnetic flux field in the earth and in a receiver coil, passing the said alternating current through an auxiliary coil having a magnetic moment substantially smaller than that of said transmitter coil to establish an auxiliary flux field in the receiver coil in an opposite sense and substantially equal value to the primary magnetic flux field, moving the said transmitter, auxiliary and receiver coils over the ground and measuring the resultant secondary voltage induced in the receiver coil, the magnitude of the resultant voltage at the instant that the said alternating current passes through its zero and maximum values being taken as indicative of the presence of a conducting body lying in the field of influence of the primary flux field.

7. A method of establishing the presence of a hidden conducting ore body which method comprises passing an alternating current of predetermined frequency through a transmitter coil to thereby establish a primary magnetic flux field in the ground and in a receiver coil, passing the said alternating current through an auxiliary coil to thereby establish an auxiliary flux field in the receiver coil in an opposite sense and substantially equal value to the primary magnetic flux field, said auxiliary flux field being sufficiently small that it does not link the region being explored moving the said transmitter, auxiliary and receiver coils over the ground and measuring the in-phase and out-of-phase component sof the resultant voltage in the receiver coil, the location of an ore zone being taken as that point where an anomalous signal is received such that the out-of-phase component of the resultant voltage is less than the in-phase component.

8. A method of establishing the presence of a conducting body which method comprises moving a directly, mutually inductively coupled transmitter coil and receiver coil above the earth; passing an alternating current of predetermined magnitude and frequency through the transmitter coil, to thereby establish a primary magnetic flux field through the earth, passing the said alternating current through an auxiliary coil having a magnetic moment substantially less than that of said transmitter coil, said auxiliary coil being directly, mutually inductively coupled to the receiver coil thereby substantially cancelling the voltage in the receiver coil which is induced therein by reason of the direct mutual inductive coupling between the transmitter and receiver coils; obtaining in-phase and out-of-phase signal voltage components relative to the current flowing in the transmitter coil and induced in the receiver coil by reason of eddy currents flowing in a conducting body lying within the field of influence of the primary flux field, but outside the field of influence of the magnetic flux field of said auxiliary coil, said signal voltage components being taken as indicative of the presence of a conducting body lying within the field of influence of the primary flux field.

9. The invention as recited in claim 8 including obtaining an in-phase reference voltage component relative to the current flowing in the transmitter coil, applying said in-phase reference voltage component to a feedback coil which is directly, mutually inductively coupled to the receiver coil so as to establish a feedback magnetic flux field which opposes the primary magnetic flux field, and adjusting the amplitude of the in-phase reference voltage component to substantially cancel any remaining primary magnetic flux field in the receiver coil.

10. Apparatus for use in geophysical exploration and comprising a transmitter coil; means for passing an exciting current of predetermined frequency through the transmitter coil; an amplifier; a receiver coil tuned to the frequency of the exciting current and connected to the input of the said amplifier; an auxiliary coil having a magnetic moment substantially smaller than that of said transmitter coil in series with the transmitter coil and inductively coupled to the receiver coil, said auxiliary coil developing an auxiliary magnetic flux field which substantially cancels the effect of the primary magnetic flux field developed by the transmitter coil at the receiver coil; a reference coil inductively coupled to the transmitter coil but electrostatically shielded therefrom, said reference coil providing an out-of-phase reference voltage; a resistor in series with the transmitter coil and auxiliary coil, said resistor providing an in-phase reference voltage; means taking an amplitude sample of the amplifier output voltage at the instant the out-of-phase reference voltage passes through zero and thus obtaining a measure of the in-phase signal component; and means taking an amplitude sample of the amplifier output voltage at the instant the in-phase reference voltage passes through zero and thus obtaining a measure of the out-of-phase signal component.

11. The invention as recited in claim 10 wherein the auxiliary coil comprises two windings disposed on opposite sides of the receiver coil.

12. The invention as recited in claim 10 including means amplifying and recording the out-of-phase and in-phase signal voltage components from the out-of-phase and in-phase samplers, respectively.

13. The invention as recited in claim 10 wherein the transmitter and receiver coils are oriented in a substantially coaxial relation.

14. The invention as recited in claim 10, including a first amplifier responsive to the output of the out-of-phase sampler and having an output suitable for actuating a recording milliammeter; a second amplifier responsive to the output of the in-phase sampler and having an output suitable for actuating a recording milliammeter; the records so obtained being accurate measures, respectively, of the out-of-phase component and in-phase component of the secondary signal voltage induced in the receiver coil as the equipment is transported over the earth.

15. The invention as recited in claim 10 wherein the transmitter, receiver and auxiliary coils are substantially coaxially positioned.

16. The invention as recited in claim 15 wherein the auxiliary coil is mounted closer to the receiver coil than the transmitter coil so that the effective mutual inductive coupling between the receiver coil and transmitting coil is substantially zero.

17. The invention as recited in claim 15 wherein the transmitter and receiver coils are mounted on opposite ends of a rigid aircraft structure thereby minimizing the effects of relative motion between the coils under flight conditions.

18. The invention as recited in claim 10, including a variable gain amplifier having as its input signal the in-phase reference voltage and having its gain controlled by the in-phase sampler output; a feedback coil inductively coupled to the receiver coil and energized by in-phase current from the variable gain amplifier, the mutual inductive coupling between the feedback coil and receiver coil being such that feedback voltage induced in the receiver coil is opposed to the in-phase component of voltage induced in the receiver coil as a result of the small amount of primary flux field remaining in the receiver coil after said substantial cancellation of the primary flux field by the auxiliary flux field.

19. The invention as recited in claim 18, including feedback means for impressing a voltage component into the receiver system in a sense opposed to the out-of-phase components of voltage induced in the receiver coil after said substantial cancellation of the primary flux field by the auxiliary flux field.

20. Apparatus for use in establishing the presence of a conducting body comprising a transmitter coil; means for passing an exciting current of predetermined frequency through the transmitter coil; an amplifier; a receiver coil tuned to the frequency of the exciting current and connected to the input of the amplifier, said receiver coil being inductively coupled to said transmitter coil; an auxiliary coil having a magnetic moment substantially less than that of said transmitter coil, carrying the same current as the transmitter coil and inductively coupled to said receiver coil; the transmitter and auxiliary coils being oriented with respect to the receiver coil so as to result in substantially zero net direct electromagnetic flux through the receiver coil; a reference coil inductively coupled to the transmitter coil, said reference coil providing an out-of-phase reference voltage; a resistor in series with the transmitter coil, said resistor providing an in-phase reference voltage; means taking an amplitude sample of the amplifier output voltage at the instant the out-of-phase reference voltage passes through zero and thus obtaining a measure of the in-phase signal component; means taking an amplitude sample of the amplifier output voltage at the instant the in-phase reference voltage passes through zero and thus obtaining a measure of the out-of-phase signal component; a variable gain amplifier having as its input signal the in-phase reference voltage and having its gain controlled by the in-phase sampler output; a feedback coil energized by current from the variable gain amplifier and inductively coupled to the receiver coil so as to impress a voltage component into the receiver coil in a sense opposed to the in-phase component of voltage induced therein by the primary flux field developed by the transmitter coil; means for impressing a voltage component in the receiver system in a sense opposed to the out-of-phase component of voltage induced therein by the primary flux field developed by the transmitter coil; a first amplifier responsive to the output of the out-of-phase sampler and having an output suitable for actuating a recording milliammeter; a second amplifier responsive to the output of the in-phase sampler and having an output suitable for actuating a recording milliammeter; the records so obtained being accurate measures, respectively, of the out-of-phase component and in-phase component of the secondary signal voltage induced in the receiver coil as the equipment is transported over the earth; the magnitude of said out-of-phase and in-phase components being taken as indicative of the presence of a conducting body lying within the primary magnetic flux field developed by the transmitter coil.

21. A method of establishing the presence of a conducting body which method comprises establishing a primary alternating magnetic flux field through a selected portion of the earth and through a pick-up coil, establishing an auxiliary alternating magnetic flux field through the pick-up coil of substantially equal strength and opposite sense to the primary magnetic flux field thereby establishing in the pick-up coil a field of substantially zero net direct magnetic flux, and measuring the out-of-phase component of the resultant voltage induced in the pick-up coil by reason of eddy currents flowing in a conducting body disposed within the field of influence of said primary flux field but outside the field of influence of said auxiliary flux field, said primary flux field being substantially greater than said auxiliary flux field in the region of said conducting body.

22. A method of establishing the presence of a conducting body which method comprises establishing a primary alternating magnetic flux field through a selected portion of the earth and through a pick-up coil, establishing an auxiliary alternating magnetic flux field through the pick-up coil of substantially equal strength and opposite sense to the primary magnetic flux field thereby establishing in the pick-up coil a field of substantially zero net direct magnetic flux, and measuring the in-phase component of the resultant voltage induced in the pick-up coil by reason by eddy currents flowing in a conducting body disposed within the field of influence of said primary flux field but outside the field of influence of said auxiliary flux field, said primary flux field being substantially greater than said auxiliary flux field in the region of said conducting body.

23. Apparatus for use in geophysical exploration from an aircraft comprising a low frequency alternating electromagnetic field source including a transmitter coil, detector means including a receiver coil for detecting variations in the field received thereby, means for supporting said source and detector means in a substantially fixed relation relative to each other, vibration isolating means for mounting said detector means to said supporting means, an auxiliary coil comprising two windings disposed on opposite sides of the receiver coil, and means responsive to the signal generated in said detector means for indicating said received field variations.

24. Apparatus for use in geophysical exploration comprising: a transmitter coil; means for passing an exciting current through the transmitter coil to set up a primary magnetic flux field; a receiver coil inductively coupled to said transmitter coil; and an auxiliary coil having a magnetic moment substantially smaller than that of said transmitter coil, inductively coupled to said receiver coil for developing an auxiliary magnetic flux field which substantially cancels the effect of the primary magnetic flux field developed by the transmitter coil in the receiver coil, wherein the auxiliary coil comprises two windings disposed on opposite sides of the receiver coil.

25. Apparatus for use in establishing the presence of a conducting body comprising: a transmitter coil; a receiver coil inductively coupled to said transmitter coil; an auxiliary coil having a magnetic moment substantially less than that of said transmitter coil inductively coupled to said receiver coil; means for passing an exciting current through said transmitter and auxiliary coils to set up direct and auxiliary magnetic flux fields, respectively, said transmitter and auxiliary coils being oriented with respect to said receiver coil so as to result in a region of zero net direct magnetic flux at said receiver coil, wherein said auxiliary coil comprises two windings disposed on opposite sides of the receiver coil.

References Cited in the file of this patent

UNITED STATES PATENTS

| | | |
|---|---|---|
| 1,812,392 | Zuschlag | June 30, 1931 |
| 1,820,953 | Sundberg | Sept. 1, 1931 |
| 2,050,418 | Boerner | Aug. 11, 1936 |
| 2,220,070 | Aiken | Nov. 5, 1940 |
| 2,489,920 | Michel | Nov. 29, 1949 |
| 2,623,924 | Cartier et al. | Dec. 30, 1952 |
| 2,741,736 | Puranen | Apr. 10, 1956 |
| 2,788,483 | Doll | Apr. 9, 1957 |
| 2,887,650 | Ruddock et al. | May 19, 1959 |
| 2,903,642 | Seigel | Sept. 8, 1959 |
| 3,015,060 | McLaughlin | Dec. 26, 1961 |